Nov. 26, 1929.                M. C. BALCER                1,737,350
                               ARM REST
                         Filed Sept. 11, 1928        2 Sheets-Sheet 1
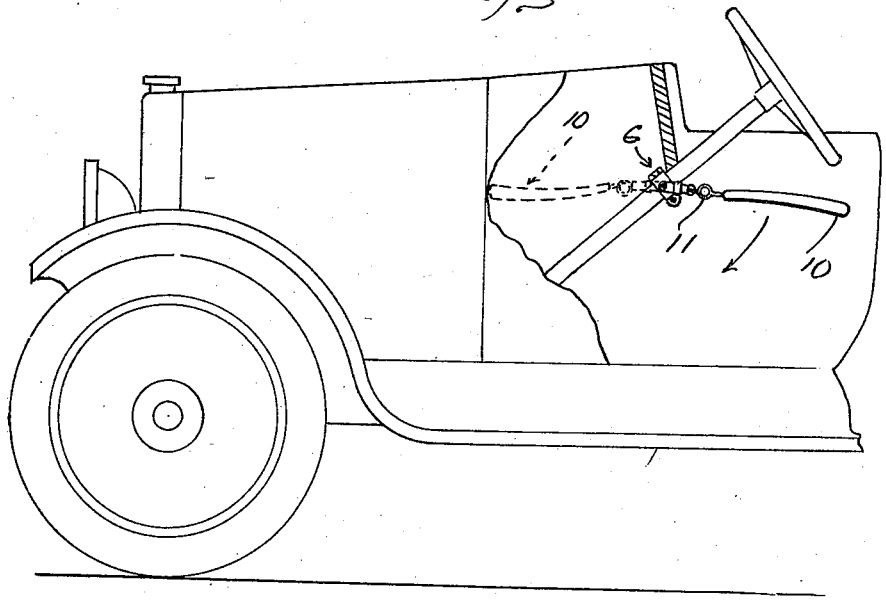
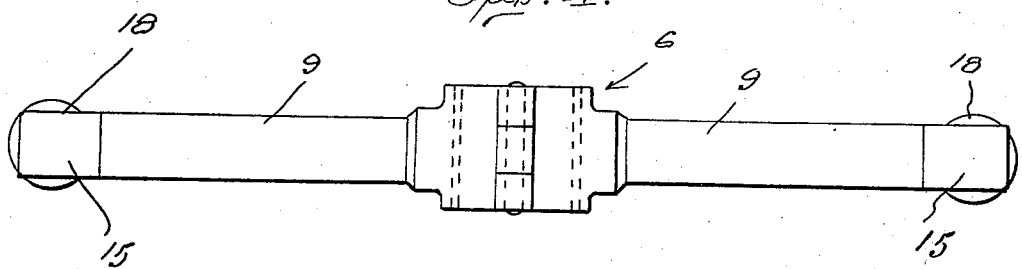
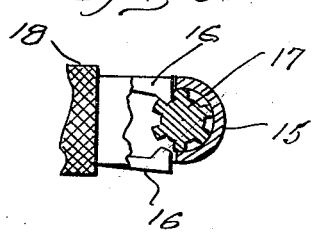
Inventor
M. C. Balcer
By Clarence A. O'Brien
                    Attorney Nov. 26, 1929.    M. C. BALCER    1,737,350
ARM REST
Filed Sept. 11, 1928    2 Sheets-Sheet 2
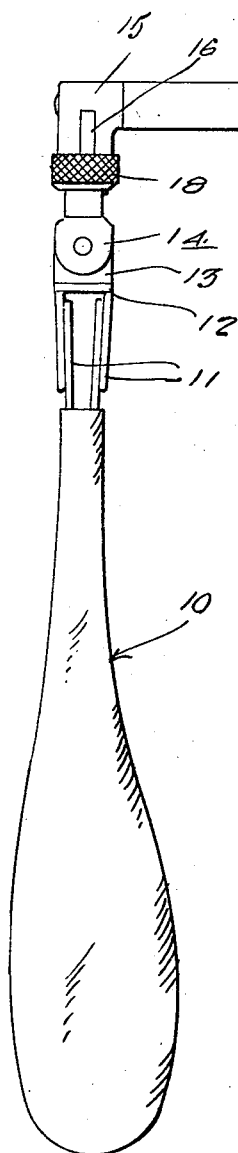
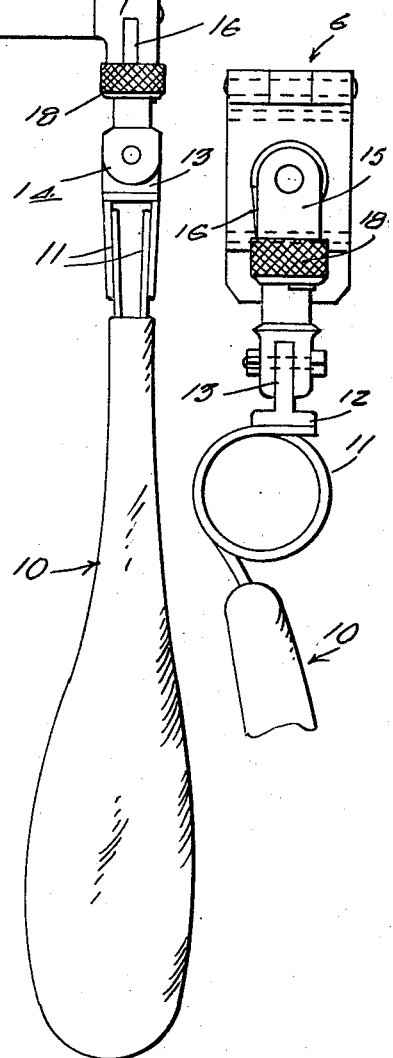
Inventor
M. C. Balcer
By Clarence A. O'Brien
Attorney Patented Nov. 26, 1929

1,737,350

UNITED STATES PATENT OFFICE

MARTIN C. BALCER, OF PONCA CITY, OKLAHOMA

ARM REST

Application filed September 11, 1928. Serial No. 305,195.

This invention relates to a structure which may be broadly entitled arm rests, the same having more particular reference to a construction which is made to fasten to a motor vehicle steering column beneath the steering wheel to provide a novel means for supporting the forearms of the driver while operating the vehicle.

The purpose of the invention is to provide a dependable arm rest structure in the form of an attachment which may be applied to the steering column of an automobile or the like to conveniently support the driver's arm while driving, the invention being especially useful for touring and long trips.

My principle object is to provide an invention of this class which is characterized by unusual simplicity in construction and arrangement and wherein the arm rests are shaped and otherwise made to provide comfortable supports and so attached to the steering column to permit them to be adjusted for elevation to be moved toward or from each other, or downward and under the instrument board to dispose them entirely out of the way.

Other features and advantages will become more readily apparent from the following description and drawings.

In the drawings:

Figure 1 is a side elevational view showing the approximate position of the device, when in use.

Figure 2 is a top plan view of the device per se, when removed from the steering column.

Figure 3 is an end view, on a slightly enlarged scale, with a portion of one of the arm rests broken away.

Figure 4 is a front elevational view of the invention.

Figure 5 is a fragmentary sectional and elevational view, showing an arrangement of retaining pawls.

The entire device can well be seen in Figure 2, wherein it will be observed that the reference character 6 designates a split steering column clamp, the split ends of which are bolted together as at 7. The clamp is preferably provided with a fabric lining 8 so as to not mar the paint on the steering wheel when the device is put into position.

Extending from diametrically opposite sides of the clamp are the tubular arms 9, which serve to support the arm rests 10. The construction at each side is the same, and a description of one will suffice for both. Each arm rest is shaped approximately as shown, being provided with a padded cushion, and it is connected at its front end by a pair of shock absorbing springs 11 to the head 12 of a coupling member 13. The coupling member is pivoted between the ears 14 of a special fitting, the pivot being such as to permit the arm rests to swing about a vertical axis in a horizontal plane. The fitting embodies an elbow 15, which is pivotally connected to the complemental arm 9. The fitting is provided with spring pressed dogs or pawls 16, engageable with the keeper notches 17 on said pin, as shown in Figure 5. Then there is a knurled retaining sleeve 18, which is obviously engaged over the pawls to fasten them in place. Thus a pivot and locking connection is provided between the fitting and the arm. This permits the arm rest to be adjusted in a vertical plane so that it may be inclined to the desired position. In fact, it allows the entire arm and its connection to be swung beneath the instrument board as shown in the dotted lines in Figure 1.

Thus, it will be seen that the arm rests are connected with the arm 9, through the medium of the universal connection, permitting vertical and horizontal adjustment and permitting subsequent yieldable action of the arm rest through the medium of the connecting spring 11.

In practice, the clamp 6 is fastened to the steering post as indicated in Figure 1, so as to permit the arm rest to be disposed underneath the steering wheel or swung back to an out of the way position in front of the instrument board. The arms are movable toward and from each other in a horizontal plane about the pivot 14, and up and down and rocked by the pawl and ratchet connection described.

Hence, a novel and convenient attachment is provided for adjustably supporting the elbows and arms while grasping the steering wheel and driving on long trips. The advantage and desirability of a device of this kind will be quite clear to persons accustomed to driving automobiles and other vehicles. Hence a more lengthy description is deemed unnecessary.

The term "motor vehicle" as herein employed is intended to comprehend automobiles, aeroplanes, motor boats and other vehicles in which steering columns are employed.

Minor changes in the shape, size, and rearrangement of details coming within the scope of the invention claimed may be resorted to, in actual practice, if desired.

I claim:

1. In a structure of the class described, a steering column attachment comprising a clamp, a pair of outstanding arms carried by the clamp, a pair of right angularly disposed arm rests, and a universal connection between the arm rest and arm.

2. In a structure of the class described, a supporting arm, means for connecting said arm with a steering wheel column, an arm rest disposed at right angles to said arm, a universal joint mounted upon said arm, and a resilient connection between the arm rest and said joint.

3. In a structure of the class described, a steering column clamp, a pair of arms connected to and extending outwardly from diametrically opposite sides of the clamp, pawl and ratchet devices at the outer end of said arm, a pair of arm rests, coupling elements pivotally connected with said pawl and ratchet devices, and spring connections between said coupling elements and arm rests.

4. In a structure of the class described, a steering column clamp, supporting members extending diametrically outwardly from opposite sides of said clamp, pawl and ratchet devices from the outer ends of said supporting elements including slidable pawl retaining collars, and spaced ears, plates pivotally mounted between said ears and swingable in a horizontal plane, said plates being provided with heads, a pair of cushioned arm rests, and coiled springs carried by the inner ends of said arm rests and connected with said heads.

In testimony whereof I affix my signature.

MARTIN C. BALCER.